(12) United States Patent
Adada et al.

(10) Patent No.: US 8,885,693 B2
(45) Date of Patent: Nov. 11, 2014

(54) AUTOMATED SATELLITE INTERFERENCE MITIGATION

(75) Inventors: Rami Adada, Orlando, FL (US); David Craig, Orlando, FL (US); Brian Millikan, Oviedo, FL (US); Kalyan Venkatraman, Orlando, FL (US); Aaron Hershberger, Fortville, IN (US)

(73) Assignee: TracStar Systems, Inc., Orlando, FL (US)

( * ) Notice: Subject to any disclaimer, the term of this patent is extended or adjusted under 35 U.S.C. 154(b) by 204 days.

(21) Appl. No.: 13/611,300

(22) Filed: Sep. 12, 2012

(65) Prior Publication Data

US 2013/0243054 A1  Sep. 19, 2013

Related U.S. Application Data

(60) Provisional application No. 61/533,923, filed on Sep. 13, 2011.

(51) Int. Cl.
*H04B 1/38* (2006.01)
*H04L 25/08* (2006.01)
*H04B 17/00* (2006.01)

(52) U.S. Cl.
CPC ............ *H04L 25/08* (2013.01); *H04B 17/0032* (2013.01)
USPC ........... 375/222; 375/296; 375/297; 375/285; 375/254

(58) Field of Classification Search
CPC ............................... H04L 29/00; H04M 11/06
USPC ......................................................... 375/222
See application file for complete search history.

(56) References Cited

U.S. PATENT DOCUMENTS

| | | | |
|---|---|---|---|
| 5,559,809 A | 9/1996 | Jeon et al. | |
| 6,212,360 B1 | 4/2001 | Fleming, III et al. | |
| 6,813,476 B1* | 11/2004 | Brooker | 455/10 |
| 6,882,217 B1* | 4/2005 | Mueller | 330/2 |
| 7,911,400 B2 | 3/2011 | Kaplan et al. | |
| 2002/0058477 A1 | 5/2002 | Chapelle | |
| 2007/0249382 A1 | 10/2007 | Trachewsky et al. | |
| 2007/0286317 A1 | 12/2007 | Stentiford et al. | |
| 2008/0018545 A1* | 1/2008 | Kaplan et al. | 343/713 |
| 2008/0274690 A1 | 11/2008 | Laufer | |
| 2009/0081971 A1 | 3/2009 | Rofougaran | |
| 2010/0135482 A1* | 6/2010 | Jagannathan et al. | 379/406.06 |

OTHER PUBLICATIONS

PCT/US2012/054761—International Search Report—Dec. 7, 2012.
Ames, Satellite Interference What It Means to Your Bottom Line, Integral Systems Service Solutions, 2009.
Federal Communications Commission, 47 CFR 25.209, antenna Performance Standards, Oct. 1, 2000.

* cited by examiner

*Primary Examiner* — Lihong Yu
(74) *Attorney, Agent, or Firm* — Wiggin and Dana LLP; Gregory S. Rosenblatt; Jonathan D. Hall

(57) ABSTRACT

An automated process to periodically check and ensure that earth terminal settings provide compliant EIRPSD. For example, one embodiment of the present invention provides an apparatus which queries the modem for its transmit symbol rate and the Block Up-Converter (BUC) for its RF output power. Using these two values and preprogrammed values for connection loss between the BUC and antenna, the current input power spectral density being transferred to the antenna is computed by the apparatus and compared to the preprogrammed regulatory limit for the specific antenna. If the limit is being exceeded, the apparatus sets BUC attenuation to compensate for the excess.

15 Claims, 3 Drawing Sheets

AUTOMATED SATELLITE INTERFERENCE MITIGATION

CROSS REFERENCE TO RELATED APPLICATIONS

This application claims the benefit of U.S. Provisional Application No. 61/533,923, filed Sep. 13, 2011.

BACKGROUND

1. Field of the Invention

The present invention relates generally to satellite communication systems. More particularly, the present invention relates to methods and apparatuses for mitigating satellite interference due to user error.

2. Description of the Related Art

Satellite interference is a problem that affects all satellite operators, costing them millions of dollars per year to resolve. The Satellite Users Interference Reduction Group (SUIRG) lists user error as a major cause of interference. One aspect of user error involves exceeding the effective isotropic radiated power spectral density (EIRPSD) limitations defined by the satellite operator/regulatory agency.

Users most often only interface with the modem, where they set parameters such as user data rate, modulation scheme, forward error correction rate, coding type and output power. These settings along with connection losses and gain stages between the modem and antenna determine the input power spectral density to the antenna which along with the antenna radiation pattern characteristics yields the EIRPSD of the terminal.

Currently it is up to the user to take into consideration all these factors, perform the necessary calculations and set the input power into the antenna to ensure the terminal is not being used inappropriately.

BRIEF SUMMARY OF THE INVENTION

The details of one or more embodiments of the invention are set forth in the accompanying drawings and the description below. Other features, objects and advantages of the invention will be apparent from the description and drawings, and from the claims.

The present disclosure provides an automated process to periodically check and ensure the earth terminal settings provide compliant EIRPSD.

According to one aspect of the disclosure, an apparatus queries the modem for its transmit symbol rate and the Block Upconverter (BUC) for its RF output power. Using these two values and preprogrammed values for connection loss between the BUC and antenna, the current power spectral density being transferred to the antenna is calculated and compared to the preprogrammed regulatory limit for the specific antenna. If the limit is being exceeded, the apparatus sets BUC attenuation to compensate for the excess.

According to another aspect of the disclosure, an apparatus calculates the current value of the power spectral density and compares that value with the regulatory limit. If the limit is being exceeded, the apparatus sets the modem transmit power to compensate for the excess.

DETAILED DESCRIPTION

Disclosed herein is an apparatus that automatically checks earth terminal settings and ensures compliance of the terminal's operation with satellite operator/regulatory agency restrictions on EIRPSD.

Abbreviations used in this description are listed in Table 1.

TABLE 1

| | |
|---|---|
| ACU | Antenna Control Unit |
| ASIM | Automated Satellite Interference Mitigation |
| BUC | Block Upconverter |
| D | Delta Attenuation (dB) |
| EIRPSD | Effective Isotropic Radiated Power Spectral Density |
| LNB | Low-Noise Block Downconverter |
| M&C | Monitor and Control |
| Po | Power Output (watts) |
| PSDL | Power Spectral Density Limit (dBW/Hz) |
| PSDo | Power Spectral Density Output (dBW/Hz) |
| RF | Radio Frequency |
| Rx | Receive |
| SUIRG | Satellite Users Interference Reduction Group |
| TSR | Transmit Symbol Rate (symbols/s) |
| Tx | Transmit |
| QPSK | Quadrature Phase-Shift Keying |

Figure 1:
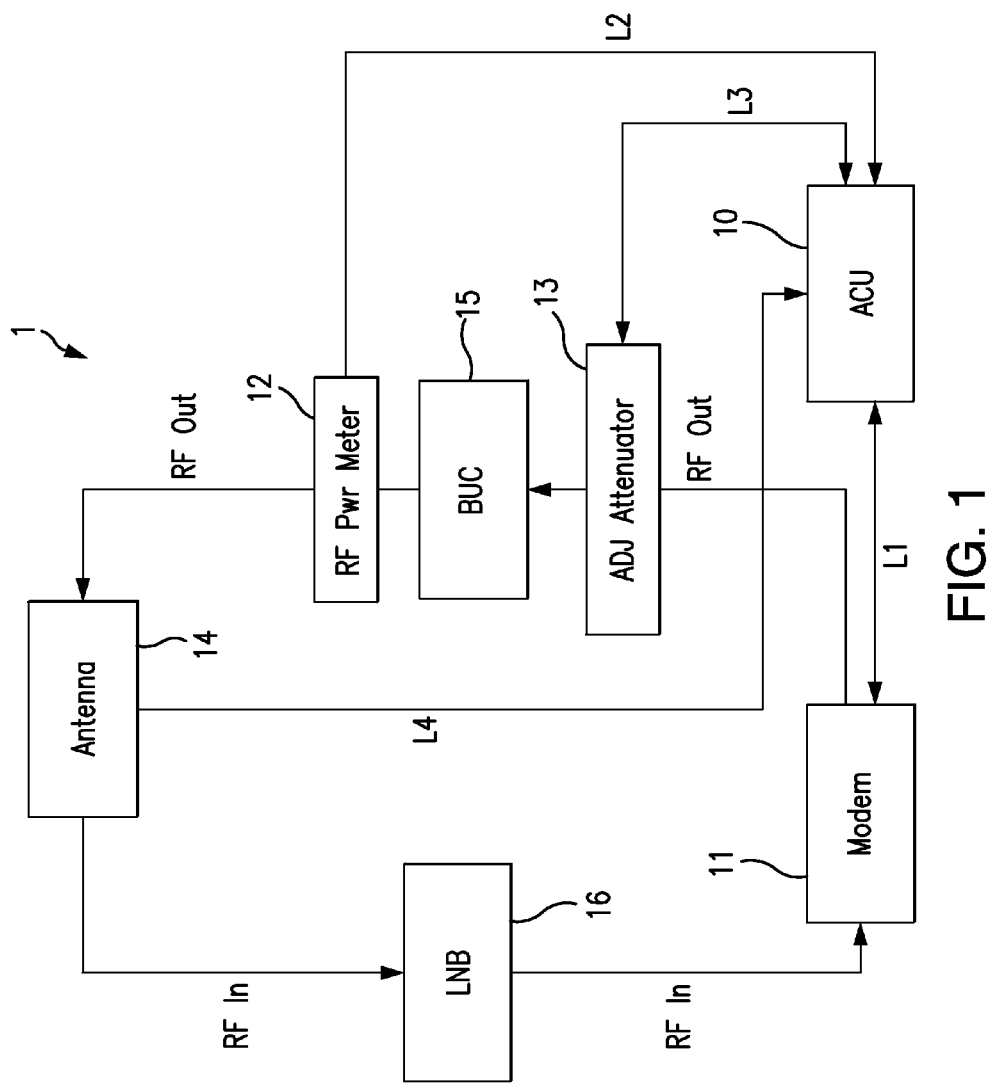
FIG. 1 is a schematic block diagram of an earth terminal including an antenna control unit, according to an embodiment of the disclosure.

In one embodiment of the invention, an Automated Satellite Interference Mitigation (ASIM) processing unit is provided which interfaces with both the BUC and modem of an earth terminal. FIG. 1 shows a block diagram of an earth terminal 1 including ACU 10, modem 11 and BUC 12. The ASIM processing unit may be incorporated into the Modem or the BUC; for motorized earth terminals, the ASIM processing unit may also be incorporated into the Antenna Control Unit (ACU). In the embodiment shown in FIG. 1, the ASIM processing unit is incorporated into ACU 10. ACU 10 communicates with modem 11 via link L1, with RF power meter 12 via link L2, with adjustable RF attenuator 13 via link L3, and with antenna 14 via link L4. Modem 11 transmits RF signals (e.g. data) to the antenna through BUC 15, and receives RF signals from the antenna through LNB 16.

Figure 2:
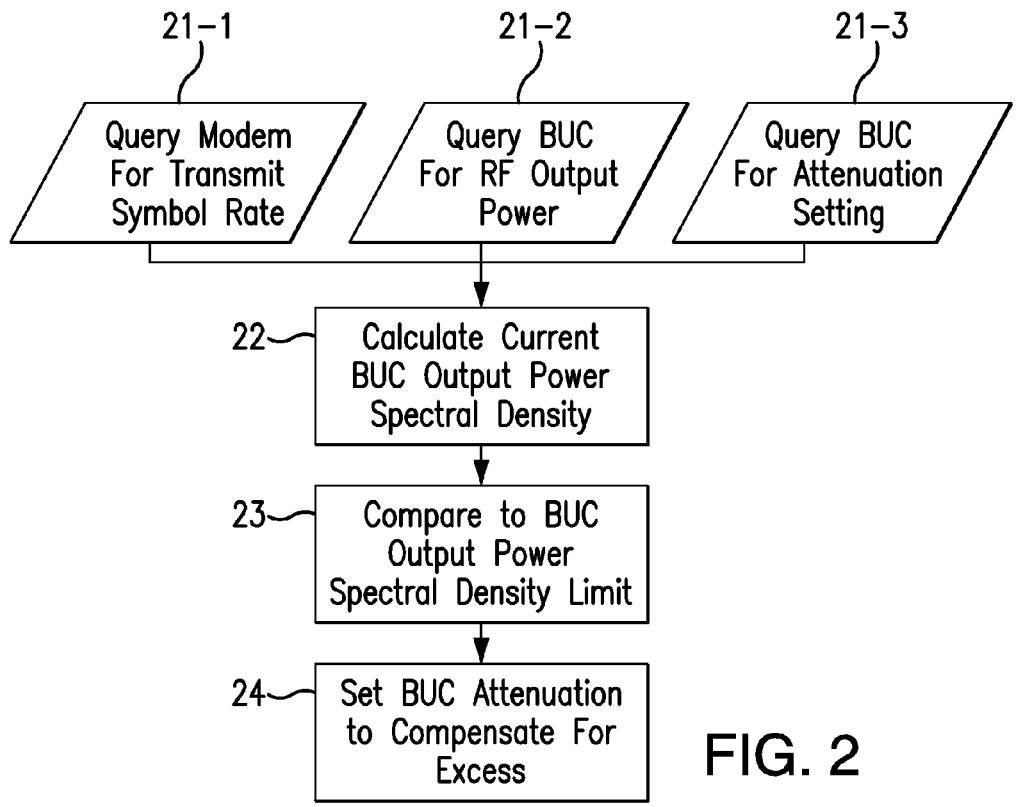
FIG. 2 is a flowchart of a routine executed by an automated satellite interference mitigation processing unit, according to an embodiment of the disclosure.

In an embodiment, the ASIM processing unit (incorporated into ACU 10) periodically executes a routine with steps as shown in FIG. 2. ACU 10 sends a query 21-1 to the modem 11 for the transmit symbol rate; a query 21-2 to the RF power meter 12 for the RF output power of the BUC; and a query 21-3 to RF attenuator 13 for the RF attenuation setting of the BUC.

The ASIM processing unit sends query 21-1 to the modem 11 for its transmit symbol rate (TSR) setting in symbols per second. Alternatively, the ASIM processing unit may query the modem for several parameters (user data rate, modulation scheme, forward error correction rate, and type of coding used) from which the TSR can be calculated. The TSR is used to approximate the bandwidth containing RF energy at the output of the BUC.

The ASIM processing unit sends query 21-2 to the RF power meter 12 for the RF output power (Po) of the BUC in watts, and query 21-3 to the RF attenuator 13 for the attenuation setting of the BUC in dB.

In step 22, the ASIM processing unit calculates the power spectral density at the output (PSDo) of the BUC in dBW/Hz, using:

$$PSDo = 10*Log(Po/TSR) \quad (1)$$

The PSDo result is compared (step 23) with the BUC output power spectral density limit (PDSL). In this embodiment, PSDL is a preprogrammed value that corresponds to the power spectral density limit for the terminal. The amount of necessary attenuation adjustment D in dB is calculated using $$D = PSDo - PSDL \quad (2)$$

An example for the used PSDL value for an earth terminal operating in the USA with an antenna that is FCC 25.209 compliant and has negligible connection losses between the BUC and antenna could be −50 dBW/Hz.

If D>0 (that is, the power spectral density output exceeds the power spectral density limit), the ASIM processing unit causes the RF attenuator 13 to increase the attenuation setting (dB) of the BUC by D to compensate for the excess (step 24).

A specific example is given to help clarify the calculations:

An earth terminal is set to uplink a digital carrier at a 512 Kbps data rate using QPSK modulation and Viterbi rate ¾ forward error correction; the connection losses between the BUC and antenna are negligible.

This results in the modem query 21-1 returning a TSR=349,184 symbols per second.

Assuming the BUC queries 21-2, 21-3 return:

$$Po = 10 \text{ W}$$

$$\text{Attenuation} = 1 \text{ dB}$$

PSDo is calculated by the ASIM processing unit:

$$PSDo = -45.43 \text{ dBW/Hz}$$

PSDL for this terminal is specified by the satellite operator to −50 dBW/Hz. This results in D:

$$D = -45.43 + 50 = 4.57 \text{ dB}.$$

The ASIM adjusts the BUC attenuation setting by D:

$$\text{New Attenuation} = 1 + 4.57 = 5.57 \text{ dB}$$

Figure 3:
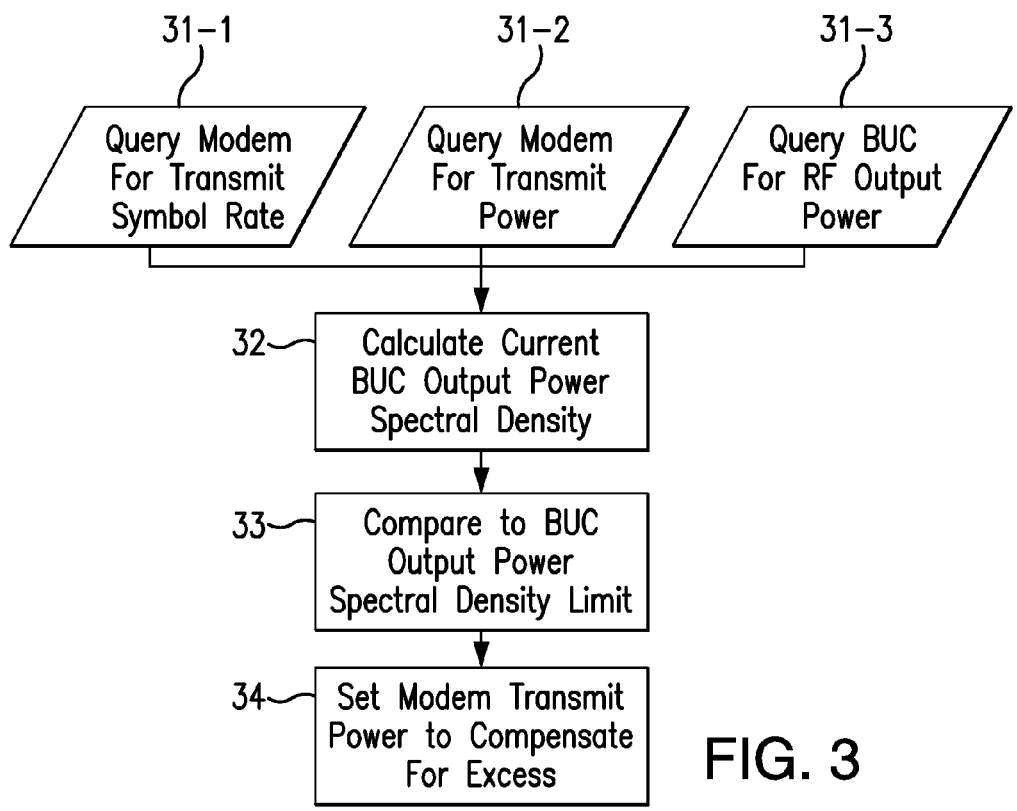
FIG. 3 is a flowchart of an alternative routine executed by an automated satellite interference mitigation processing unit, according to another embodiment of the disclosure.

FIG. 3 shows a flowchart for a different routine according to another embodiment of the disclosure, where instead of using BUC attenuation to compensate for the excess in EIRPSD, the ASIM processing unit decreases the current value of the modem transmit power by the excess value.

ACU 10 sends a query 31-1 to the modem 11 for the transmit symbol rate (TSR); a query 31-2 to the modem 11 for the modem transmit power; and a query 31-3 to the RF power meter 12 for the RF output power of the BUC (Po). In step 32, the power spectral density at the output (PSDo) of the BUC in dBW/Hz is calculated using formula (1) above. In step 33, the result for PSDo is compared with the preprogrammed value for PSDL using formula (2) above.

If D>0 (that is, the power spectral density output exceeds the power spectral density limit), the ASIM processing unit sets the modem transmit power to compensate for the excess (step 34).

Figure 4:
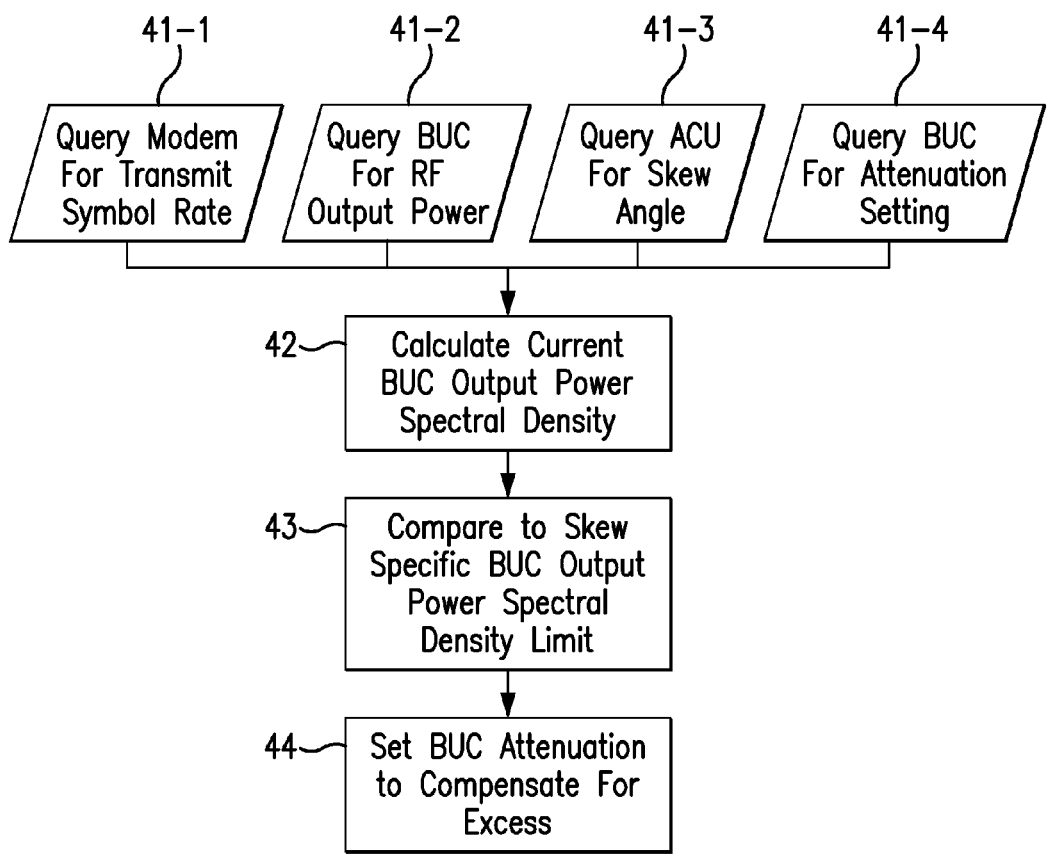
FIG. 4 is a flowchart of a another alternative routine executed by an automated satellite interference mitigation processing unit, according to additional embodiment of the disclosure.

FIG. 4 shows a flowchart for an additional routine according to yet another embodiment of the disclosure, in a case where earth terminal 1 uses an antenna with a non-circularly symmetric pattern. For this type of terminal, the PSDL may depend on the relative on-axis rotation or skew angle.

The ASIM processing unit sends a query 41-1 to the modem 11 for the transmit symbol rate (TSR); a query 41-2 to the RF power meter 12 for the RF output power of the BUC (Po); and a query 41-4 to RF attenuator 13 for the RF attenuation setting of the BUC.

The ASIM processing unit also sends a query 41-3 to the ACU to determine the skew angle of the antenna. In an embodiment, the earth terminal includes a motorized antenna, and antenna encoder readings may be obtained from the ACU. The ASIM processing unit queries the antenna's encoder skew angle that indexes into a preprogrammed lookup table to determine the PSDL for the antenna. Since this processing is contained in the ACU, the ASIM processing unit does not have to interface to an external device.

In step 42, the power spectral density at the output (PSDo) of the BUC in dBW/Hz is calculated using formula (1) above.

In step 43, the result for PSDo is compared with a skew angle specific value for PSDL obtained from the ACU, using formula (2) above.

If D>0 (that is, the power spectral density output exceeds the power spectral density limit for that skew angle), the ASIM processing unit causes the RF attenuator 13 to increase the attenuation setting (dB) of the BUC by D to compensate for the excess (step 44).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for setting operating parameters of an earth terminal, the earth terminal including a processing unit, a modem, and a block up-converter (BUC), the method comprising the steps of:

obtaining a transit symbol rate (TSR) of the modem;
   obtaining an RF output power (Po) of the BUC; using the processing unit,
      calculating a value of a BUC output power spectral density (PSDo) according to PSDo=10*Log(Po/TSR), and
      comparing the PSDo value with a predetermined value of a power spectral density limit (PSDL) to determine an excess value (D) by which PSDo exceeds PSDL; and
   if D>0, changing an attenuation setting of the BUC by D, thereby compensating for the excess.

2. The method according to claim 1, wherein the earth terminal includes an antenna control unit (ACU), and the processing unit is incorporated into the ACU.

3. The method according to claim 2, wherein the processing unit queries the modem to obtain the TSR and queries an RF power meter coupled to the BUC to obtain the Po, and further comprising obtaining the attenuation setting of the BUC by querying an adjustable attenuator coupled to the BUC.

4. The method according to claim 1, wherein said obtaining the TSR comprises
   querying the modem for parameters including a user data rate, a modulation scheme, a forward error correction rate, and a type of coding; and
   calculating the TSR based on said parameters.

5. The method according to claim 1, wherein said compensating causes the earth terminal to be compliant with satellite operator/regulatory agency restrictions regarding effective isotropic radiated power spectral density (EIRPSD).

6. The method according to claim 2, further comprising:
obtaining an antenna skew angle, and wherein the PSDL value is specific to said skew angle.

7. The method according to claim 6, wherein the processing unit queries the ACU to obtain the antenna skew angle.

8. A method for setting operating parameters of an earth terminal, the earth terminal including a processing unit, a modem, and a block up-converter (BUC), the method comprising the steps of:
obtaining a transit symbol rate (TSR) of the modem;
obtaining an RF output power (Po) of the BUC; using the processing unit,
calculating a value of a BUC output power spectral density (PSDo) according to PSDo=10*Log(Po/TSR), and
comparing the PSDo value with a predetermined value of a power spectral density limit (PSDL) to determine an excess value (D) by which PSDo exceeds PSDL; and
if D>0, changing a transmit power of the modem so that PSDo does not exceed PSDL.

9. The method according to claim 8, wherein the earth terminal includes an antenna control unit (ACU), and the processing unit is incorporated into the ACU.

10. The method according to claim 9, wherein the processing unit queries the modem to obtain the TSR and queries an RF power meter coupled to the BUC to obtain the Po, and further comprising obtaining the transmit power of the modem by querying the modem.

11. The method according to claim 8, wherein said obtaining the TSR comprises
querying the modem for parameters including a user data rate, a modulation scheme, a forward error correction rate, and a type of coding; and calculating the TSR based on said parameters.

12. The method according to claim 8, wherein said changing the transmit power of the modem causes the earth terminal to be compliant with satellite operator/regulatory agency restrictions regarding effective isotropic radiated power spectral density (EfRPSD).

13. An earth terminal comprising:
an antenna;
a block up-converter (BUC) coupled to the antenna;
an RF power meter coupled to the BUC for measuring an output power of the BUC; an
adjustable attenuator coupled to the BUC for adjusting an attenuation setting of the BUC;
a modem coupled to the BUC for transmitting RF signals to the BUC; and an
antenna control unit (ACU) coupled to the antenna, the RF power meter, the attenuator, and the modem;
a processing unit incorporated into the ACU;
the processing unit configured to
query the modem for a transit symbol rate (TSR) of the modem,
query the RF power meter for an RF output power (Po) of the BUC; calculate a value of a BUC output power spectral density (PSDo) according to PSDo=10*Log (Po/TSR),
compare the PSDo value with a predetermined value of a power spectral density limit (PSDL) to determine an excess value (D) by which PSDo exceeds PSDL; and
if D>0 cause an adjustment of one of the BUC attenuation setting and an output power of the modem.

14. The earth terminal according to claim 13, wherein the processing unit is configured to query the ACU for an antenna skew angle, and wherein the PSDL value is specific to said skew angle.

15. The earth terminal according to claim 13, wherein the earth terminal is compliant with satellite operator/regulatory agency restrictions regarding effective isotropic radiated power spectral density (ELRPSD), in accordance with said adjustment.

* * * * *